United States Patent [19]

Shinjo

[11] Patent Number: 4,507,859
[45] Date of Patent: Apr. 2, 1985

[54] SELF-PIERCING NUT HOLDING DEVICE

[75] Inventor: Katsumi Shinjo, Osaka, Japan

[73] Assignee: VE-Wissenschaftlich-Technischer Betrieb Keramik, Meissen, German Democratic Rep.

[21] Appl. No.: 469,485

[22] Filed: Feb. 24, 1983

[30] Foreign Application Priority Data

Mar. 4, 1982 [JP] Japan .................. 57-30928[U]

[51] Int. Cl.³ .................. B23P 10/00; B23P 11/00
[52] U.S. Cl. ........................ 29/798; 29/432; 29/432.1
[58] Field of Search .............. 29/798, 432, 432.1

[56] References Cited

U.S. PATENT DOCUMENTS 3,405,436 10/1968 Koett .................. 29/798
3,718,965 3/1973 Steward .................. 29/798
3,740,818 6/1973 Grube .................. 29/798
3,810,290 5/1974 Grube .................. 29/798
3,971,116 4/1976 Goodsmith .................. 29/798

Primary Examiner—Howard N. Goldberg
Assistant Examiner—Steven Nichols
Attorney, Agent, or Firm—Jordan and Hamburg

[57] ABSTRACT

A self-piercing nut holding device for use in association with an automatic assembling machine, the holding device including a passageway adapted to allow a punch to pass through, the passageway including a nut delivery outlet through which nuts are individually placed at the "hold" position, the passageway being provided with an elastic member in a recess produced in its defining side wall, the elastic member having a body portion and a pair of leg portions which are supple against a force acting when the elastic member holds a nut situated at the "hold" position. The suppleness of the elastic member protects same against breaking; otherwise frequent breakages would lead to frequent interruption of the automatic assembling operation.

5 Claims, 5 Drawing Figures

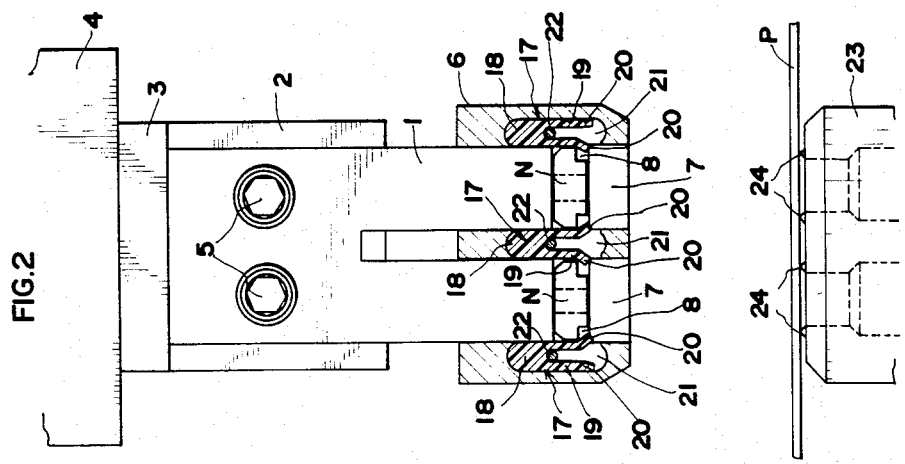
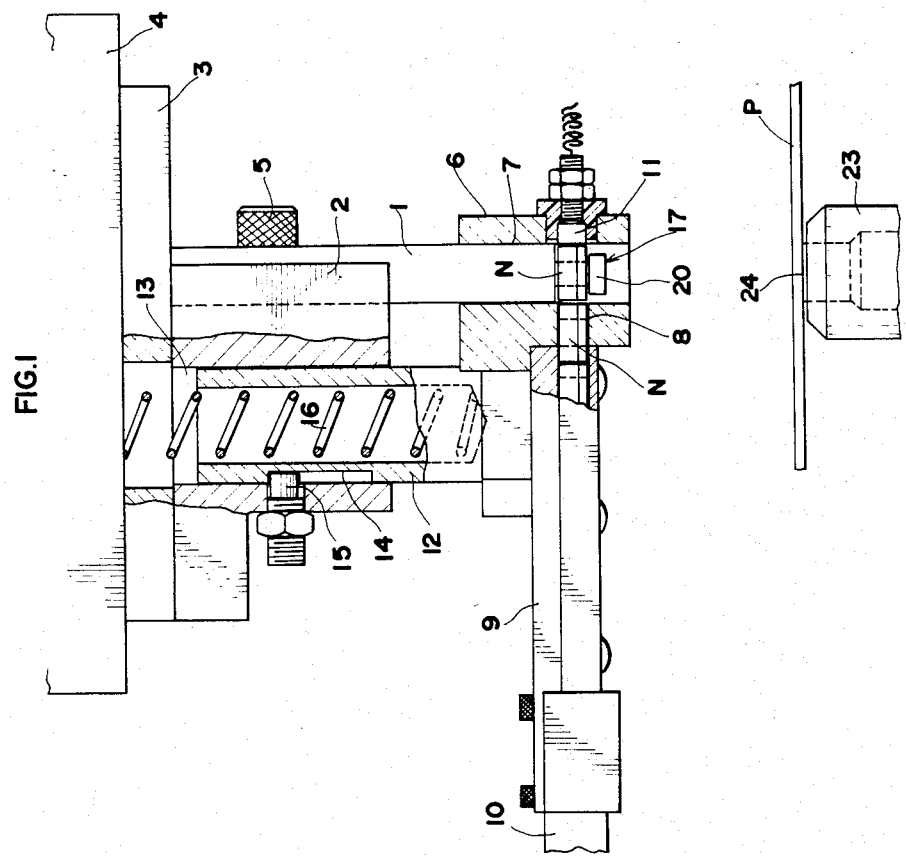

SELF-PIERCING NUT HOLDING DEVICE

BACKGROUND OF THE INVENTION

The present invention relates to a self-piercing nut holding device for use in association with an automatic assembling machine by which the nuts are successively affixed to a metal panel.

The self-piercing nut, commonly so called, is known in the art, and widely used, particularly in the automobile and the electric appliance industries. As its name implies, this nut has an end face serving as a punch against a metal panel, thereby causing the nut to punch an installation aperture in the metal panel placed on a swaging die by pressure exerted on the nut.

To carry out a smooth automatic assembling operating, it is essential to feed a succession of self-piercing nuts (hereinafter referred to merely as nuts) smoothly. In addition, each nut must take a right posture at the punching position; otherwise the nut would fail to be affixed to the metal panel or would be affixed in a wrong posture thereto. Here is a difficulty in holding the succession of nuts in the right or "ready" posture with respect to the metal panel. This requires a delicate handling touch upon the individual nuts delivered at the punching position. The inventor invented a holding device which incorporated such requirements. The invention is disclosed in Japanese Utility Model Publication No. 52-31488.

According to the prior invention, the holding device has a pair of elastic members fitted in depressions produced in opposite walls of the device, wherein the elastic members are intended to hold the nut placed at the punching position "softly". This had yielded a desirable result, and dispelled a worry about a possible mallocation of the nut on the metal panel due to its inadequate posture. In addition, the provision of the elastic member had eliminated the necessity of providing an intricate device specially built for holding the nuts in an orderly manner. As a result, the holding device was extremely simplified in construction, which reflects in the production cost. The simplified construction leads to a minimized size of the assembling machine in which the nut holding device is essentially required. This will be of particular advantage when the assembling machine is united with a press unit, which has a limited accommodation space.

Through the repeated use, however, one drawback has been discovered in the life of the elastic members. This is fatal to the automatic assembling operation.

OBJECTS AND SUMMARY OF THE INVENTION

The present invention is directed toward solving the problems pointed out above, and has for its object to provide an improved nut holding device which can secure a long period of use because of the prolonged life of the elastic members incorporated therein, thereby obviating the possibility of frequent interruption of the assembling operation.

Another object of the present invention is to provide an improved nut holding device which is economical in construction and maintenance.

Other objects and advantages of the present invention will become more apparent from the following description when taken in connection with the accompanying drawings, which show, for purpose of illustration only, a nut holding device of the invention.

According to one advantageous aspect of the present invention, there is provided a piercing-nut holding device for use in association with an automatic assembling machine, the device comprising:

- a passageway through which a punch is slidably moved up and down so as to press a nut into a metal panel;
- a nut delivery outlet which is open in the passageway, wherein the nut delivering outlet is communicated with an automatic nut supplying means, such as a chute;
- an elastic member provided in the passageway, the elastic member having a body portion and a pair of leg portions each including foot portions adapted to hold a nut;
- the elastic member being situated in the delivery position at which the nut delivery outlet is open in the passageway, wherein the foot portions of the elastic member are protruded into the passageway to the extent that they come into engagement with the nut so as to hold same.

According to another advantageous aspect of the present invention, the elastic member is made of plastic moldings, such as polyurethanes or nylon moldings, and is pivotally supported in a recess produced in the defining side wall of the passageway.

BRIEF EXPLANATION OF THE DRAWINGS

FIG. 1 is a partially cross-sectional view showing an automatic assembling machine incorporating a nut holding device in accordance with the present invention;

FIG. 2 is a partially cross-sectional side view of the arrangement in FIG. 1;

DETAILED DESCRIPTION OF THE INVENTION

Figure 3:
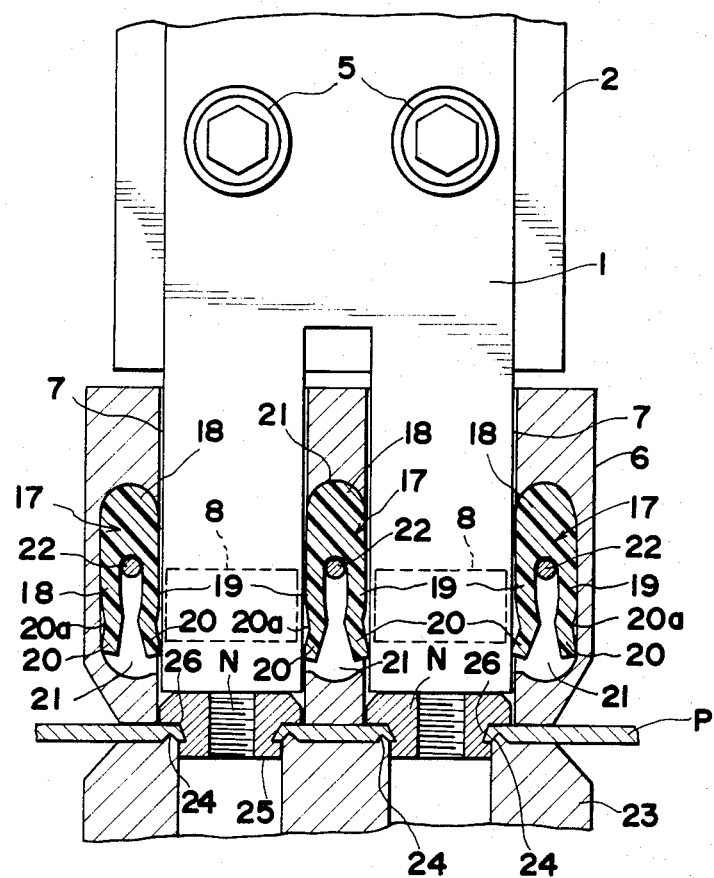
FIG. 3 is a schematic view, on an enlarged scale, of the same side of the arrangement of FIG. 2, particularly to show the operation thereof.
Figure 4:
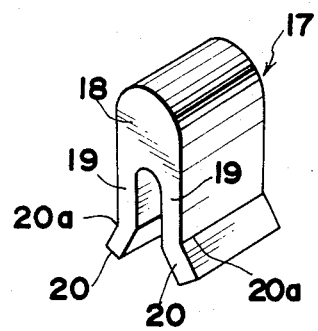
FIG. 4 is a perspective view showing an elastic member incorporated in the nut holding device in FIG. 1.
Figure 5:
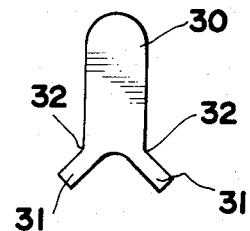
FIG. 5 is a front view showing a prior art elastic member.

In order to explain the background of the present invention, reference will be more particularly made to a typical example of the prior art nut holding device, which is featured by an elastic member, shown in FIG. 5, incorporated therein.

The elastic member has a body portion 30 and a pair of leg portions 31, which are outwardly bended. The leg portions 31 serve as a holder for the nut in an elastic manner, as implied in FIG. 2. However, the leg portions are liable to receive bending stress exerted by the nut, wherein the stress tends to concentrate on bended corners 32. The breakage of the elastic member occurs in the bended corners 32.

Referring now to the embodiment of the present invention shown in FIGS. 1 to 4, the reference numeral 1 designates a punch whereby a nut N is pressed against a metal panel P. The illustrated type is a double nut punching system, in which, as clearly shown in FIG. 2, two nuts N are equally affixed to the same metal panel P in parallel. The present invention is not limited to the double punching system, but is applicable to a single punching system or other multi punching system.

The punch 1 is fastened to a punch holder 2 by means of a bolt 5, and the punch holder 2 is fastened to a ram 4 through a press board 3. In this way the punch 1 ascends and descends in accordance with the movement of the ram 4.

The reference numeral 6 designates a nut holder, which has two passageways 7 adapted to allow the punch 1 to pass through. The passageway 7 includes a nut delivery hole 8 which is open in its lower section. The nut delivery hole 8 communicates with a chute 9 leading to a flexible chute hose 10, through which nuts N are successibly transported into the passageway 7. The reference numeral 11 designates a detector whereby it is ascertained whether the delivered nut N takes a right or "ready" posture in the passageway 7. If an inappropriate posture taken by the nut N is detected, it is electrically signalled, and the deliverying of the nuts N is stopped.

The reference numeral 12 designates a cylindrical guide post secured behind the nut holder 6, the guide post 12 being reciprocally movable in a bore 13 produced in the punch holder 2, in parallel with the passageway 7. The guide post 12 has a recess 14 axially produced on its side, the recess 14 accepting a stop pin 15 secured to the punch holder 2, thereby limiting the movement of the guide post 12 with respect to the punch holder 2. The reference numeral 16 designates a compression spring whereby the guide post 12 is normally urged downwards. The upper end of the compression spring 16 is secured to the ram 4. In this way the punch 1 and the nut holder 6 are jointly moved up and down by means of the ram 4. It is also arranged that the relative positions of the punch 1 and the nut holder 6 can be changed in the limited range provided by engagement of the stop pin 15 with the recess 14.

The nut holder 6 includes a pair of elastic members 17 made of plastic, such as nylon or polyurethanes. The elastic member 17 has a body portion 18 and a pair of leg portions 19, each of which has a foot portion 20 adapted to hold the nut N. The elastic member 17 is fitted in a recess 21, which is produced in a side wall defining the passageway 7. The recesses 21 are produced oppositely to each other. In the recess 21 the elastic member 17 is held at its crotch portion by means of a pin 22, wherein the foot portion 20 is protruded into the passageway 7 so as to hold the nut N in an elastic manner.

The reference numeral 23 designates a swaging die against the punch 1, the swaging die including a swaging edge 24 at its top on which the metal panel P is placed. The nut N has a punching face 25.

FIGS. 1 and 2 show the punch 1 in its ascending position. At this stage the nut N is delivered into the "hold" position in the passageway 7, where the nut is held by means of the foot portions 20 of the elastic members 17. In accordance with the movement of the ram 4 the punch 1 and the nut holder 6 are descended. When the under-surface of the nut holder 6 comes into engagement with the panel P, the movement of the nut holder 6 is stopped, whereas the punch 1 continues to descend together with the ram 4. In this way the nut N is forced downwards defying the holding force provided by the foot portions 20 of the elastic members 17, wherein the leg portions 19 of each elastic member 17 are forced backwards in each recess 21. The relatively long leg portion 19 absorbs the force given by the punch 1 through the nut N, thereby protecting the elastic member 17 against breakage due to the bending stress likely to concentrate along the bent corners 20a.

When the leg portions 19 are withdrawn from the "hold" position, the nut N is released from the foot portions 20 thereof, and is urged to punch a hole in the metal panel P under the pressure provided by the punch 1. The periphery of the opened hole is designated by the reference numeral 26, which is swaged by the swaging edges 24 of the die 23, thereby enabling the nut N to be anchored in the hole.

The elastic member 17 is made of plastic, such as polyurethanes or nylon, which is molded in one body. According to the present invention, the elastic member 17 has a prolonged leg portion 19, which is resilient against a force perpendicular thereto. This will be appreciated by comparison with the elastic member shown in FIG. 5, in which the leg portions 31 are directly attached to the body portion 30. In the prior art elastic member the force exerted by the nut tends to concentrate along the bent corners 32, in which the elastic member readily breaks. According to the present invention this problem has been overcome. In addition, the care-free maintenance of the device has been ensured because of the resulting prolonged life of the individual elastic members incorporated therein.

What is claimed is:

1. A nut holding device adapted to be attached to an assembling machine for consecutively receiving and holding nuts therein to apply the nuts to work pieces by means of the assembling machine, comprising;

a nut holder having at least one passageway to allow the assembling machine to reciprocatingly move therethrough, a nut delivery hole communicating with the passageway to deliver the nuts to the passageway one by one, at least two recesses situated along two opposed sides of the passageway and extending beyond the nut delivery hole, and at least two pins situated inside the recesses parallel to the opposed sides of the passageway, and at least two elastic members situated in the recesses of the nut holder, each elastic member including a body portion, two leg portions extending from the body portion parallel to each other, a crotch portion between the two leg portions, and two foot portions at forward ends of the leg portions, said foot portions having bent corners and being slighly oriented outwardly from the bent corners to incline relative to the parallel leg portions, each elastic member being located in the recess and supported by the pin situated at the crotch portion thereof so that when the nut is disposed in the passageway outside the nut delivery hole, the leg portions of the two elastic members are located substantially adjacent to the nut and the nut is substantially supported by the foot portions of the two elastic members, whereby when the nut is pushed outwardly by means of the assembling machine, the leg portions of the elastic members bend toward the recesses to thereby allow the nut to move out of the passageway without selectively imparting stress to the elastic members.

2. A nut holding device according to claim 1, in which said passageway is substantially vertically arranged in the nut holder, and the nut delivery hole is substantially horizontally arranged in the nut holder to intersect with the passageway at right angle.

3. A nut holding device according to claim 2, in which said assembling machine is provided with at least one punch, said punch being slidably situated in the passageway.

4. A nut holding device according to claim 3, in which said nut holder is provided with a plurality of passageways parallel to each other, a plurality of nut delivery holes communicating with respective passageways, and a plurality of recesses with a respective one of the pins situated in each thereof, the elastic members being situated in the recesses to support the nuts.

5. A nut holding device according to claim 4, in which said elastic member is made of plastic.

* * * * *

UNITED STATES PATENT AND TRADEMARK OFFICE
CERTIFICATE OF CORRECTION

PATENT NO. : 4,507,859
DATED      : April 2, 1985
INVENTOR(S): Katsumi Shinjo

It is certified that error appears in the above-identified patent and that said Letters Patent is hereby corrected as shown below:

On the title page, Item (73) should read
--Assignee: Yugen Kaisha Shinjoseisakusho, Osaka, Japan--.

Signed and Sealed this

Twenty-fourth Day of September 1985

[SEAL]

Attest:

DONALD J. QUIGG

Attesting Officer

Commissioner of Patents and Trademarks—Designate